US005543243A

United States Patent [19]

Brecht

[11] Patent Number: 5,543,243
[45] Date of Patent: Aug. 6, 1996

[54] BATTERY ELECTROLYTE CIRCULATION SYSTEM

[75] Inventor: William B. Brecht, Seal Beach, Calif.

[73] Assignee: Trojan Battery Company, Santa Fe Springs, Calif.

[21] Appl. No.: 290,742

[22] PCT Filed: Dec. 1, 1993

[86] PCT No.: PCT/US93/11698

§ 371 Date: Aug. 23, 1994

§ 102(e) Date: Aug. 23, 1994

[87] PCT Pub. No.: WO95/15586

PCT Pub. Date: Jun. 8, 1995

[51] Int. Cl.$^6$ .................. H01M 2/38; H01M 2/36
[52] U.S. Cl. .................. 429/51; 429/71; 429/75; 429/81; 429/83; 429/95
[58] Field of Search .................. 429/51, 71, 75, 429/81, 83, 95

[56] References Cited

U.S. PATENT DOCUMENTS

| | | |
|---|---|---|
| 1,112,861 | 10/1914 | Snyder . |
| 1,471,048 | 10/1923 | Menger . |
| 4,105,829 | 8/1978 | Venero .................. 429/15 |
| 4,377,445 | 3/1983 | Grimes . |
| 5,340,667 | 8/1994 | Stinson et al. .................. 429/64 |

FOREIGN PATENT DOCUMENTS 2378 of 1898 United Kingdom .

Primary Examiner—John S. Maples
Attorney, Agent, or Firm—Christie, Parker & Hale, LLP

[57] ABSTRACT

A liquid electrolyte battery (10) comprises a number of electrolytic cells (12), an inlet port (22) extending into a first electrolytic cell (12-1), an electrolyte transport channel (30) residing within each electrolytic cell, a number of carry-over passages (40) hydraulically connecting adjacent electrolytic cells, an outlet port (50) extending from a last electrolytic cell (12-4), and a pump (58) for introducing an electrolyte solution or air into the electrolytic cells. The battery electrolyte is replenished by introducing an electrolyte solution (14) into the first electrolytic cell, causing the electrolyte level to rise and be hydraulically transported through the carry-over passages to fill each electrolytic cell. The electrolyte exiting the last electrolytic cell is collected and reintroduced back into the first electrolytic cell and circulated throughout the battery. The electrolyte exiting the battery may be collected in an electrolyte reservoir (72) and circulated through a temperature management device (78) to ensure a battery temperature within design parameters. The electrolyte level in each electrolytic cell is adjusted to a predetermined level by introducing air into the battery causing the hydraulic transport of an electrolyte volume residing above an inlet end (54) of the outlet port through the outlet port in the last electrolytic cell, and the electrolyte volume above an inlet end (42) of the carry-over passage through the carry-over passage in each other electrolytic cell. The air exiting the last electrolytic cell may be vented or treated for the removal of hazardous gases.

31 Claims, 7 Drawing Sheets

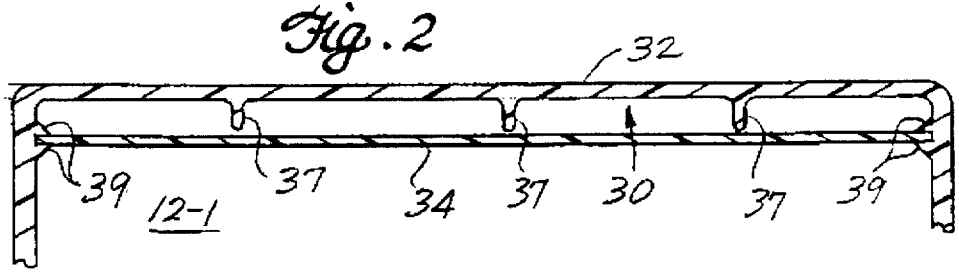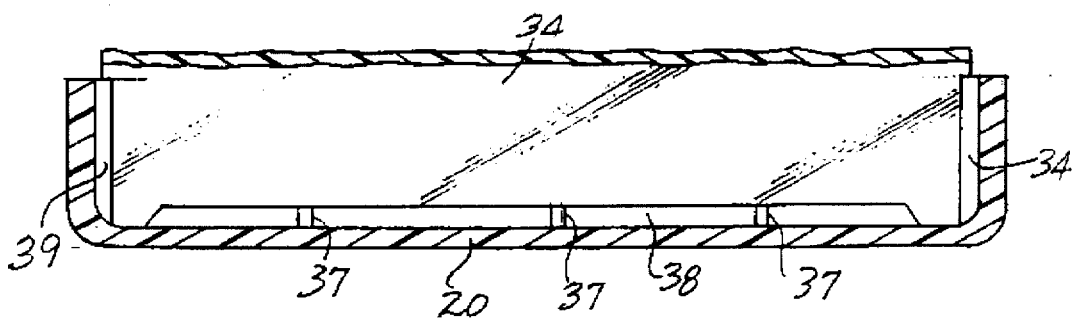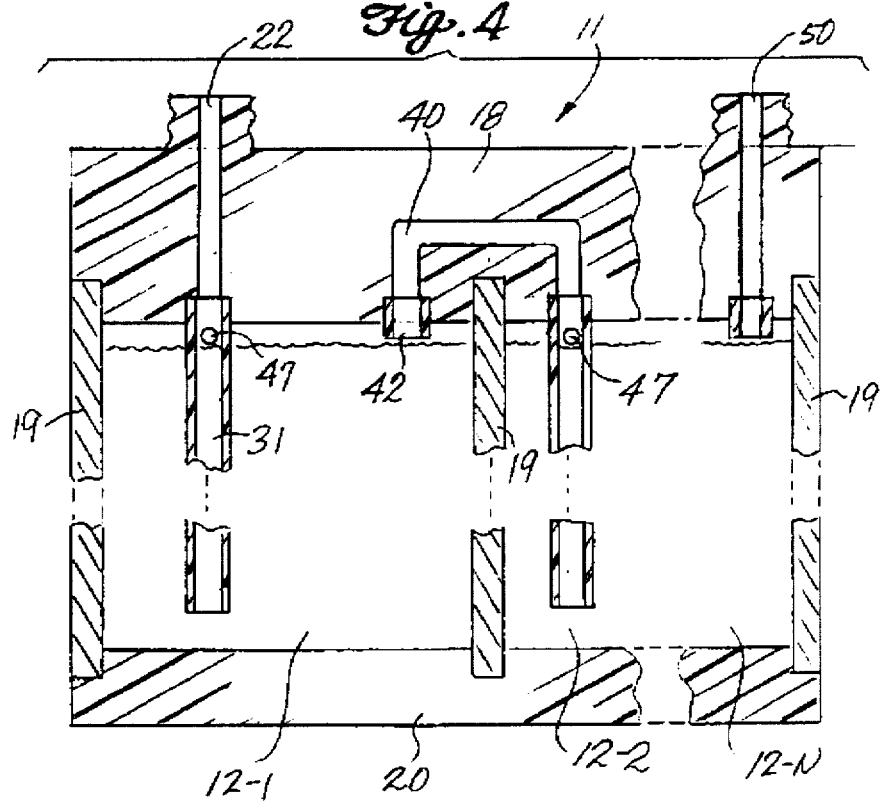

5,543,243

BATTERY ELECTROLYTE CIRCULATION SYSTEM

FIELD OF THE INVENTION

This invention relates to the construction of a flooded electrolyte storage battery that facilitates the replenishment, circulation, and conditioning of the battery electrolyte and also relates to a process for charging such batteries.

BACKGROUND OF THE INVENTION

Although there has been considerable effort spent investigating alternative electrochemical systems, the flooded electrolyte lead-acid battery is still the battery of choice for general purposes such as starting a vehicle, boat or airplane engine, emergency lighting, electric vehicle motive power, energy buffer storage for solar-electric energy, and field hardware, both industrial and military. These batteries may be periodically charged from a generator or other source of suitable DC power.

Historically, the electric power for such applications has been provided by conventional lead-acid batteries. The conventional lead-acid battery is a multi-cell structure, each cell generally comprising a set of vertical interdigitated monopolar positive and negative plates formed of lead or lead-alloy grids containing layers of electrochemically active pastes or active materials. The paste on the positive electrode plate when charged comprises lead dioxide ($PbO_2$), which is the positive active material, and the negative plate contains a negative active material such as sponge lead. An acid electrolyte based on sulfuric acid is interposed between the positive and negative plates. The acid electrolyte, in effect, is a third active material in each cell of a lead acid battery and it, like the lead oxide anodic active material and the sponge lead cathodic active material, is reversibly changed during discharge of such a battery.

Bipolar batteries have recently gained attention and may serve to replace the use of the conventional battery in such applications due to their inherently decreased size and weight. Bipolar battery construction comprises a series of electrode plates that each contain a negative active material on one side and a positive active material on the other side, hence the terms "bipolar" and "biplate". The biplates are serially arranged in such a fashion that the positive side of one plate is directed toward the negative side of an adjacent plate. The bipolar battery is made up of separate electrolytic cells that are defined by biplate surfaces of opposing polarities. The biplates must be impervious to electrolyte and be electrically conductive to provide a serial electrical connection between cells.

Both conventional and bipolar lead acid batteries are characterized by a series of electrolytic cells. During the charging of these batteries, as well as through normal discharge, the water component of the electrolyte contained in each electrolytic cell is converted by electrolysis to form hydrogen gas and oxygen. The construction of some forms of these batteries permits the release of these gases by venting them to the atmosphere. Other forms of these batteries are valve regulated and are constructed so as to facilitate both the recombination of the oxygen gas and its reintroduction into the electrolyte solution. The electrolysis of the electrolyte during the charging of a vented battery produce a loss in the water constituent of the acid electrolyte, thereby causing the concentration of that acid and its specific gravity to increase and the liquid level to drop. Ideally, the concentration and specific gravity of a fully-charged flooded electrolyte lead-acid battery should be within a relatively narrow range of values for which the battery has been designed. An acid electrolyte of too-low concentration produces a decrease in battery performance, while an acid electrolyte of too-high concentration decreases the useful life of the battery and also reduces battery discharge performance. Therefore, in batteries where water loss can occur, it is necessary to periodically add water to the electrolyte to replenish the volume of electrolyte in the battery and to bring the specific gravity of the electrolyte into the design range from a too-high value. In order to permit the volumetric replenishment of the electrolyte, these batteries are typically constructed with a sealable opening at each cell which extends to an outside top surface of the battery. Accordingly, the user can replenish the electrolyte volume in each cell by adding water through each cell opening.

The technique of replenishing a battery electrolyte by adding water to each individual cell can be a dangerous, messy, time consuming, and inaccurate operation. When the user removes the cap of each cell during the replenishment operation, the user is exposed to both the battery electrolyte and the gases. The battery electrolyte is extremely acidic, and may cause burns to skin or permanent damage to clothing and the like. Therefore, contact by the user is to be avoided. Additionally, the gases produced during the charging or discharge of the battery is largely hydrogen which may be explosive under certain conditions.

During the replenishment operation it is not uncommon for the water being used to fill the battery electrolytic cell, to spill onto the surface of the battery or onto the user. The dangers associated with coming into contact with acidic battery electrolyte has already been described. However, when water is used to replenish the electrolytic cell the spilled water will oftentimes combine with concentrated electrolyte on the surface to form an acidic solution. The clean up of this spilled water may place the user in contact with the acidic solution, posing a risk of injury to the user. Additionally, improper watering practices, such as adding water to the electrolytic cells in a discharged battery, may result in electrolyte "flooding", due to the increase in electrolyte volume associated with the charging of the battery, again posing a risk to the user.

Replenishing each individual electrolytic cell with the proper amount of electrolyte is a matter of the user's judgement and requires that the user repeat the process of adding water and visually checking the level in each cell until the proper level is achieved. During the charging operation, the technique of visually checking the electrolyte level in each cell may pose a risk of electrolyte contact to the user due to generation of effervescent electrolyte caused by the gassing or electrolysis reaction of the water component of the electrolyte.

The construction of conventional and bipolar flooded electrolyte batteries also restricts the circulation and mixing of the battery electrolyte within each cell during the charging operation. Mixing of the electrolyte is important in order to ensure that each electrolytic cell comprises a homogeneous volume of electrolyte having a uniform specific gravity. Specific gravity is a measure the ability of the desired electrolyte to participate in the electrochemical reaction. Accordingly, an electrolytic cell having a homogenous electrolyte of selected volume and specific gravity is desirable because it will necessarily render an optimal amount of electrical energy and power and assure long life.

In conventional and bipolar electrolyte batteries, the agitation and mixing of electrolyte in each cell during the charging operation is accomplished by passing an amount of current usually measured as ampere-hours into the battery in excess of that required to restore the voltage capacity of the particular battery. This operation is referred to as "overcharging" the battery. During a normal charging operation, a current is passed into the battery for the purpose of reconstituting the active materials within the battery. The applied current reverses the electrochemical reaction responsible for the production of electrical energy during the proceeding discharge cycle, causing the reconstitution of the active materials. As the charging operation proceeds, the active material will continue to be reconstituted until the voltage and capacity of the battery is fully restored at which time the battery is said to be completely charged.

The additional current passed into the battery after it has been fully charged and reconstitution of the cell active materials (i.e., during the overcharge operation) no longer causes the reversal of the electrochemical reaction and reconstitution of the cell active materials, but will instead cause the water component of the electrolyte to electrolyze. The electrolysis of the electrolyte causes the gas products of that process (hydrogen and oxygen) to migrate through the volume of electrolyte as free bubbles rising to the surface of each electrolytic cell. The movement of the electrolysis gas bubbles through the electrolyte volume serves to agitate and mix the electrolyte within each electrolytic cell. As the overcharge operation continues, the agitation of the electrolysis gas bubbles produces a homogeneous volume of electrolyte having a uniform specific gravity. An electrolyte volume having a uniform specific gravity is desirable because it serves to maximize the electrical energy storage potential and life of each electrolytic cell. However, the operation of overcharging the battery in order to achieve a homogeneous volume of electrolyte generates heat and corrosion of the positive current collector which shortens the life of the battery, increases the need for electrolyte replenishment, increases the time and electrical energy consumed in charging the battery, and is economically inefficient.

It is therefore seen that a need exists for a flooded electrolyte battery conventional, bipolar or otherwise) which is constructed to facilitate the efficient replenishment of battery electrolyte in a manner that is not dangerous, messy, or time consuming and permits the user to easily and accurately replenish each electrolytic cell with the correct amount of electrolyte having the correct specific gravity.

A need exists for a flooded electrolytic battery (conventional, bipolar or otherwise) which is constructed to facilitate the mixing and homogenization of the battery electrolyte within each cell in a manner that avoids the need to overcharge the battery, and thus eliminates the adverse affects associated with the overcharge operation.

SUMMARY OF THE INVENTION

This invention addresses and fulfills the needs identified above. It does so economically, simply, efficiently and reliably.

Generally speaking, this invention provides a flooded electrolyte battery comprising a structure which facilitates electrolyte conditioning, replenishment and circulation by transporting the electrolyte within the battery throughout a series of electrolytic cells from a single location outside the battery. The battery comprises an inlet port extending from outside the battery into a first cell, a number of carry-over passages hydraulically interconnecting all of the several cells within the battery, a transport channel within each cell, and an outlet port extending from a position within a last cell to a position outside the battery. There are no moving parts in the battery.

The electrolyte volume in the battery is replenished by introducing an electrolyte solution into the inlet port to enter a transport channel which directs the flow of the electrolyte downwardly to a lower portion of a first electrolytic cell. The first cell is filled to a level which causes the electrolyte to enter and flow in response to a pressure differential through a carry-over passage into a second cell where the electrolyte enters a transport channel and flows to a lower portion of the second cell. The electrolyte fills the second cell to a level where the pressure differential in that cell causes the electrolyte to enter and flow through a further carry-over passage to a third cell where the events occurring in the first and second cells are repeated. The hydraulic transport of electrolyte between electrolytic cells is repeated in the manner described until each electrolytic cell is replenished and the electrolyte exits the battery through an outlet port extending from a last electrolytic cell.

The electrolyte may be circulated throughout each electrolytic cell by collecting the electrolyte exiting the last cell of the battery and reintroducing it back into the first cell. The electrolyte may be circulated through a temperature regulating means in order to maintain the battery's temperature within design parameters either during a charging operation or prior to discharge. The electrolyte may be collected in an electrolyte reservoir to facilitate adding make up water to the electrolyte to adjust its specific gravity and volume. Particulate matter may be removed from the electrolyte by gravity settling in a suitably configured electrolyte reservoir, or by circulating the electrolyte through a filtration device.

The level of electrolyte in each electrolytic cell is adjusted to a predetermined level by introducing air into the inlet port and then into the upper portion of the first cell. The air increases the headspace pressure of the cell causing a volume of electrolyte residing above an inlet end of the carry-over passage to be transported through that carry-over passage and into the second cell. The combination of air and electrolyte entering the second cell causes a volume of electrolyte above the inlet end of the carry-over passage from the second cell to be transported through the next carry-over passage into the third cell. The hydraulic transport of air and electrolyte serially from cell to cell is repeated in the manner described until the level of electrolyte in each electrolytic cell is adjusted to a predetermined level and the air and electrolyte exits the battery through the outlet port extending from a last electrolytic cell. During the leveling process, hazardous gases may be purged from the battery by the circulation of air and treated by circulating the air exiting the battery through an air purification device or routing it to a catalytic convertor to form water. The predetermined level of electrolyte in each cell is determined by the location of the inlet end to the carry-over passage from the cell, and by the location of the inlet end to the outlet port in the last cell; it is a working level of the electrolyte during use of the battery.

BRIEF DESCRIPTION OF THE DRAWINGS

The above-mentioned and other features of this invention are set forth in the following detailed description of the presently preferred and other embodiments of the invention, which description is presented with reference to the accompanying drawings wherein:

FIG. 1 illustrates commencement of an electrolyte replenishment operation;

FIG. 2 is a cross-section view taken along line 2—2 in FIG. 1;

FIG. 3 is a cross-section view taken along line 3—3 in FIG. 1;

FIG. 4 is a fragmentary cross-sectional elevation view of an exemplary bipolar battery according to the present invention;

FIG. 5 illustrates the states of the electrolytic cells at the end of the electrolyte pumping phase of the procedure;

FIG. 6 shows an initial stage of the cell leveling phase of the procedure;

FIG. 7 shows the battery after the electrolyte in each electrolytic cell has been leveled;

FIG. 10 is a schematic diagram of a charging apparatus useful to implement the procedural aspects of this invention.

DETAILED DESCRIPTION

The need to conserve resources and reduce pollution directs attention to the electrolyte battery as a desirable alternative to internal combustion engines and power source for an automobile. However, for the public to adopt battery powered vehicles, their use and maintenance must be at least as convenient as the hydrocarbon powered vehicles that they are replacing. For example, apart from reducing air pollution, there is little incentive for an automobile owner to give up a gasoline fueled automobile in favor of a battery powered automobile when the battery powered automobile is less convenient and more costly to maintain.

The principal costs associated with owning a battery powered automobile, apart from the initial purchase cost, is the cost of recharging, servicing, and eventually replacing the battery or batteries. Electrolyte batteries, conventional or bipolar, lead-acid or other, all have a limited life that is dependent on the materials used within the battery and upon their ability to participate in the electrochemical reactions that produce electricity. To maximize the useful life of electrolyte batteries, the user must, at the very least, recharge the battery and replenish the battery electrolyte that has been lost during the electrochemical reactions which produce and release electrical energy. Since the cost to replace the battery or batteries used in an electric automobile may be substantial, it is highly desirable that the useful life of the electrolyte battery be maximized through improved charging and electrolyte replenishment procedures that can be conveniently carried out by the user.

This invention relates to methods and equipment for maximizing the useful life of an electrolyte battery, conventional or bipolar, that may be used in applications such as the automobile. The inventive methods permit a user to maximize the useful life of an electrolyte battery in a manner that is convenient, cost effective, and will remove the dangers and risks associated with battery maintenance.

FIGS. 1–3 and 5–7 illustrate, in simplified form, a flooded electrolyte battery constructed according to principles of this invention, and which, for purposes of illustration and clarity, comprises four electrolytic cells. It is, therefore, to be understood that the principles of this invention apply to an electrolyte battery comprising any plural number of electrolytic cells. For purposes of reference, the uppermost portion of the battery will hereafter be referred to as the top of the battery and the bottommost portion of the battery will hereafter be referred to as the bottom of the battery. For purposes of definition, a flooded battery as referred to comprises any type of electrolyte battery that can be characterized as having a plurality of electrodes immersed in an electrolyte solution.

Figure 1:
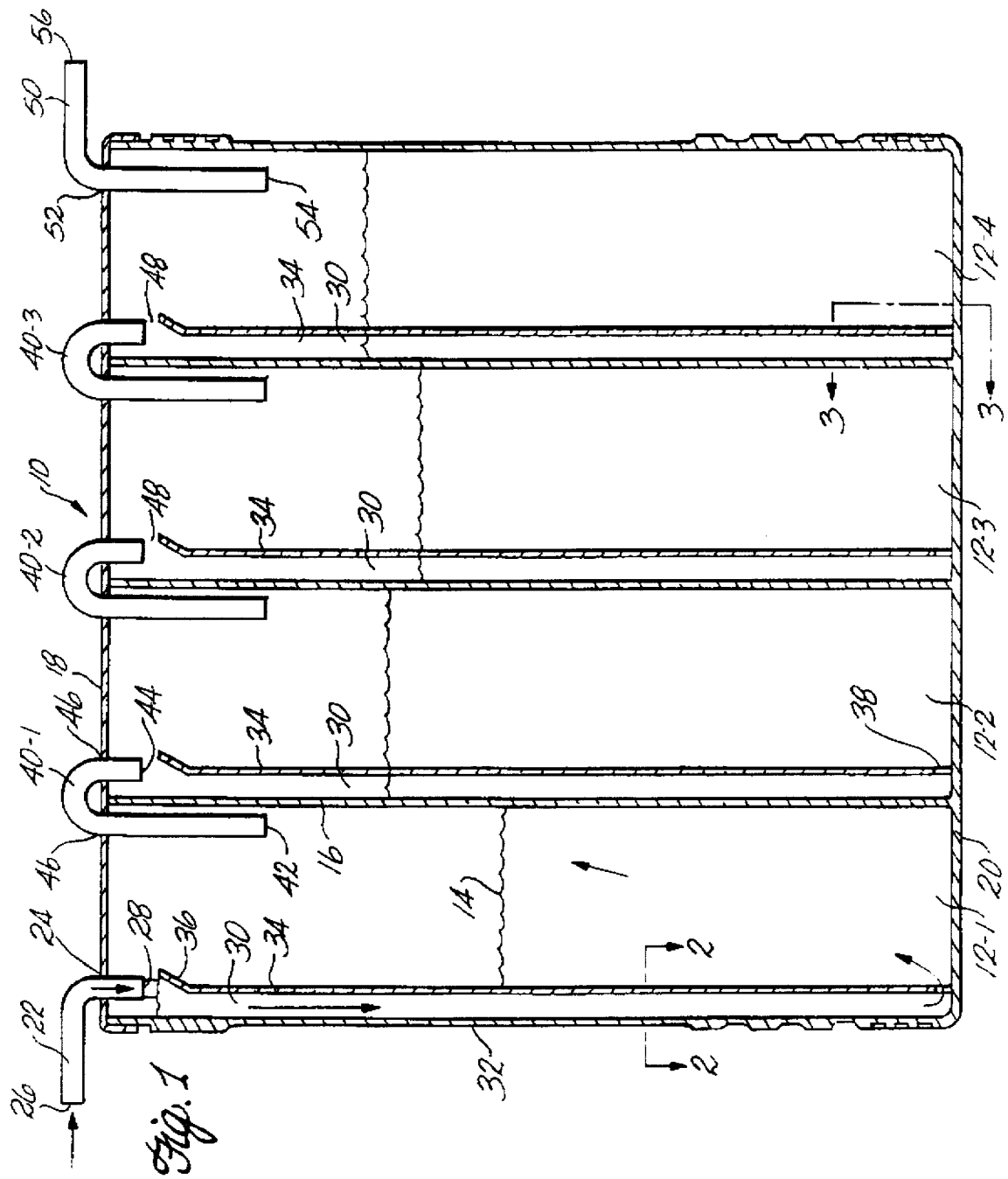
FIGS. 1, 5, 6, and 7 are cross-sectional elevation views of a preferred embodiment of a flooded electrolyte battery, constructed to facilitate the replenishment and circulation of battery electrolyte, at successive stages in practice of the procedural aspects of this invention; more specifically.

FIG. 1 shows a preferred embodiment of a flooded electrolyte battery 10 according to principles of this invention. Battery 10 comprises a number of electrolytic cells 12 which each may comprise a number of electrically conductive electrodes (not shown) and electrically nonconductive separators (not shown) immersed in an electrolyte solution 14. The electrolyte solution may include any type of liquid capable of participating substantially with active materials disposed on each electrode in an electrochemical reaction for producing electricity. In lead-acid electrolyte batteries an electrolyte comprising an aqueous sulfuric acid solution is preferred. It is to be understood that the electrolyte battery according to this invention may comprise a conventional flooded monopolar battery, a flooded bipolar battery (see FIG. 4), or any other type of flooded electrolyte battery.

The electrolytic cells 12 of the battery are physically separated from adjoining cells by cell partitions 16 which extend vertically from the top of the battery to the bottom of the battery. Each electrolytic cell is bound on its top by a battery cover 18 which may extend to cover and form a gas and electrolyte tight seal across all of the cells in the battery. Each cell is bounded on its bottom by a base 20 which may extend to cover and form a seal across all of the cells at the bottom of the battery. The cell partitions 16 are spaced apart at preferably equidistant positions from each other throughout the battery to form the series of preferably equal volume cells 12.

An inlet port 22 extends from outside of the battery 12 through an inlet hole 24 in the battery cover 18 and into a first cell 12-1. The inlet port may comprise an L-shaped tube positioned with its horizontal portion located outside of the battery and its vertical portion extending into the battery. The inlet port comprises an inlet end 26 at an end outside of the battery, and an outlet end 28 at an opposite end within the first electrolytic cell 12-1. The location of the inlet hole 24 preferably causes the inlet port 22 to enter the cell 12-1 at a position near a battery wall 32.

An electrolyte transport channel 30 extends vertically along the battery wall 32 in the first electrolyte cell 12-1, and other such channels extend vertically along a cell partition 16 or other cell wall in each other cell 12. Each channel opens to its cell adjacent the bottom of the cell. As shown in FIGS. 1 and 2, the transport channels 30 can be formed by a space between a channel partition 34 and the battery wall 32, in the first cell, and by spaces between a channel partition 34 and a cell partition or wall in each other cell. In a preferred embodiment, the channel partitions 34 can each comprise a rectangular sheet (not shown) having a horizontal dimension equal to the width of each electrolytic cell parallel to wall 32 and a vertical dimension slightly shorter than the height of each cell. The channel partitions may be made from electrically nonconductive materials that are chemically resistant to the effect of the electrolyte and may include polymeric materials such as polypropylene and the like.

Each channel partition 34 preferably has a flared upper end 36 which is positioned near the battery top within each electrolytic cell. The flared end 36 forms a wide inlet mouth in the channel 30 for directing into the channel the liquid electrolyte which can be introduced into the cell, as through the inlet port 22 or through a carry-over passage 413. As shown in FIG. 3, each channel partition defines a channel outlet opening 38 at its bottom end near the cell bottom. The channel outlet opening 38 may be formed either by a single slot opening or by plural openings adjacent the cell bottom. Channel 30 provides a passage for the flow of electrolyte introduced into the top of the cell to an entry into the cell adjacent the bottom of the cell through opening 38.

The position of each channel partition in preferably parallel relation to either the battery wall or a cell partition can be maintained by a number of vertical ribs 37 which can extend from the wall or partitions, as shown in FIG. 2, or from the channel partition itself. If present, the ribs subdivide the channel into a plurality of vertical electrolyte flow passages to the bottom of each cell.

As shown in FIGS. 2 and 3, in a preferred embodiment, each battery side wall enclosing the electrolytic cells comprises at least one pair of ridges 39 per each cell. The ridges are arranged to accommodate the thickness of the channel partition. Each partition is placed into position within its cell to form the transport channel 30 by inserting the partition so that its vertical edges lie between the ridges at each battery wall. Once in place, the ridges restrict the movement of the channel partition and maintain its spaced parallel relationship with the battery wall or cell partition.

The battery can be manufactured by placing the channel partitions within each electrolytic cell before the battery electrode plates are introduced. In order to permit the passage of the battery electrodes past the flared portion of the channel partition, the channel partition may be constructed having a live hinge near the flared portion to allow the flared portion to be moved aside and out of the way to facilitate the electrode plate installation. The flared portion can be an integral member of the battery, molded into a permanent battery element.

It is to be understood that the transport channel 30 can have a configuration other than that specifically described and illustrated. For example, instead of being formed between the channel partition and the battery wall or cell partition, the transport channel may comprise a tube that extends vertically from the battery cover into the cell to an open lower end near the cell floor; see, for example, FIG. 4 which illustrates the practice of this invention in the context of a bipolar battery.

Each electrolytic cell 12 is hydraulically connected at its upper end to the upper end of an adjacent cell by an electrolyte carry-over passage 40 or by an equivalent duct in or in association with the upper boundary of the electrolytic cell within the battery. Each carry-over passage may comprise an inverted U-shaped tube having substantially parallel legs, an inlet end 42 and an outlet end 44. Each carry-over passage can extend from one cell to an adjacent cell through a pair of carry-over passage holes 46 located in the battery cover 18 as shown in FIG. 1. Alternatively, each carry-over passage may extend from one cell to an adjacent cell through a carry-over passage hole located in an upper portion of the cell partition 16. The carry-over passage holes are located so that the outlet end 44 of each carry-over passage is aligned with the upper end of a transport channel 30. In FIG. 1, the carry-over passages 40 are shown having their inlet ends 42 at greater distances below the top of the cells than their outlet ends 44. As discussed in detail below, the location of the inlet end 42 from the highest part of the carry-over passage is significant because it defines the electrolyte level in each electrolytic cell 12 during a leveling operation performed according to methods of this invention. Additionally, the length of the outlet end 44 of each carry-over passage is also significant because it is desired that an air gap or headspace 48 be maintained between the outlet end and the adjacent transport channel opening. This air gap is important because it facilitates low pressure replenishing and leveling of the electrolyte in each cell according to methods of this invention. The smaller the air gap, i.e., the smaller the air space in the electrolytic cell, the lower the pressure associated with electrolyte replenishing. The air gap 48 or opening in the liquid flow path is not required but is preferred to reduce liquid and air back pressure associated with the electrolyte replenishment operation. This reduced back pressure translates into reduced pump requirements and simpler and safer acid transport.

An outlet port 50 extends vertically from a last electrolytic cell 124, through an outlet hole 52 in the battery cover 18. The outlet port may comprise an L-shaped tube having an inlet end 54 within the last cell and an outlet end 56 outside of the battery. Like the inlet end 42 of each carry-over passage 18, the length of the inlet end of the outlet port 50 is important because it defines the electrolyte level in the last electrolytic cell during a leveling operation according to methods of this invention.

The electrolytic cells in the flooded electrolyte battery are completely sealed from the atmosphere except for the existence of the inlet and outlet ports. The electrolytic cells 12 are completely sealed from each other except for the cross-over passages 40 hydraulically connecting them.

Bipolar batteries can also be constructed according to practice of this invention. FIG. 4 shows a sectional view of a bipolar battery 11 comprising several electrolytic cells 12-1 through 12-N each defined by a pair of bipolar electrode plates 19, or "biplates." The top portion of each of the cells making up the bipolar battery is sealed from the atmosphere by a battery cover 18. The cover comprises at least one inlet port 22 extending through the cover from outside the battery into a first cell 12-1. The inlet port 22 empties into an electrolyte transport passage 31 positioned along an adjacent electrode plate 19 and extending downwardly into the first cell. The transport passage 31 may comprise a hollow tube or the like made from the same type of electrically nonconductive and chemically inert materials previously described for the transport channel partitions 34 in the embodiment illustrated in FIG. 1. The transport passage comprises an air hole 47 near the top portion of the cell that serves the same function as the air gap 48 previously described in the embodiment illustrated in FIG. 1. Alternatively, the carry-over passages and transport passage described in FIG. 4 may also be used in conventional flooded electrolyte batteries, such as that described in FIGS. 1, 5, 6, and 7.

The cover 18 also comprises a number of carry-over passages 40 which serves to hydraulically interconnect adjacent bipolar cells. Each carry-over passage comprises an inlet end, positioned near the top of each cell, an outlet end which empties into a transport passage 31 in an adjacent cell, the outlet end having an air hole 47 near the cover. The cover 18 also comprises at least one outlet port 50 extending from a position within a last cell 12-N, through the cover to a position outside the bipolar battery.

Like the embodiment described in FIG. 1, the inlet position for each carry-over passage 40 and the outlet port is important because it serves to define the electrolyte level in each electrolyte cell during a leveling operation according to methods of this invention. Additionally, the air hole 47 in each carry-over passage is important because it serves to permit the flow of air, during an air purge operation that will be described in detail below, to remove electrolyte from the carry-over passage. The removal of electrolyte from the carry-over passages is desirable because electrolyte remaining inside the carry-over passages may cause the interconnecting electrolytic cells to electrically short circuit. Alternatively, instead of passing through the battery cover 18, the carry-over passages 40 may be configured to pass through a cell partition 16.

Although specifically described and illustrated in FIG. 4, it is to be understood that other bipolar battery configurations are within the scope of this invention. For example, the battery cover 18 may be configured so that the portion of the carry-over passage connecting its inlet end and outlet end comprises a channel along the top surface of the battery cover. In this embodiment, the carry-over passage may be formed by placing an appropriately sized and configured cover over the channel in the battery cover.

FIG. 1 shows a preferred embodiment of the electrolyte battery according to principles of this invention at a condition where the electrolyte level in each electrolytic cell is low and in need of replenishment, i.e., addition of electrolyte to restore desired electrolyte levels in the several cells. The electrolyte battery 10 constructed according to principles of this invention permits replenishment of the electrolyte in each of the cells to a predetermined of working level by methods according to this invention.

The electrolyte 14 can be replenished by introducing (as by use of pump 58 shown in FIG. 8) the desired electrolyte or water solution into the inlet end 26 of the inlet port 22, causing the electrolyte to flow through the inlet port and into the first electrolytic cell 12-1 as shown in FIG. 1. The electrolyte exits the outlet end 28 of the inlet port 22 and empties into the electrolyte transport channel 30. The electrolyte flows vertically down the depth of the transport channel, out the channel outlet opening 38 near the bottom portion of the cell and vertically upwards through the volume of the cell. The level in the first electrolyte cell rises as the electrolyte is continuously introduced through the inlet port.

Figure 5:
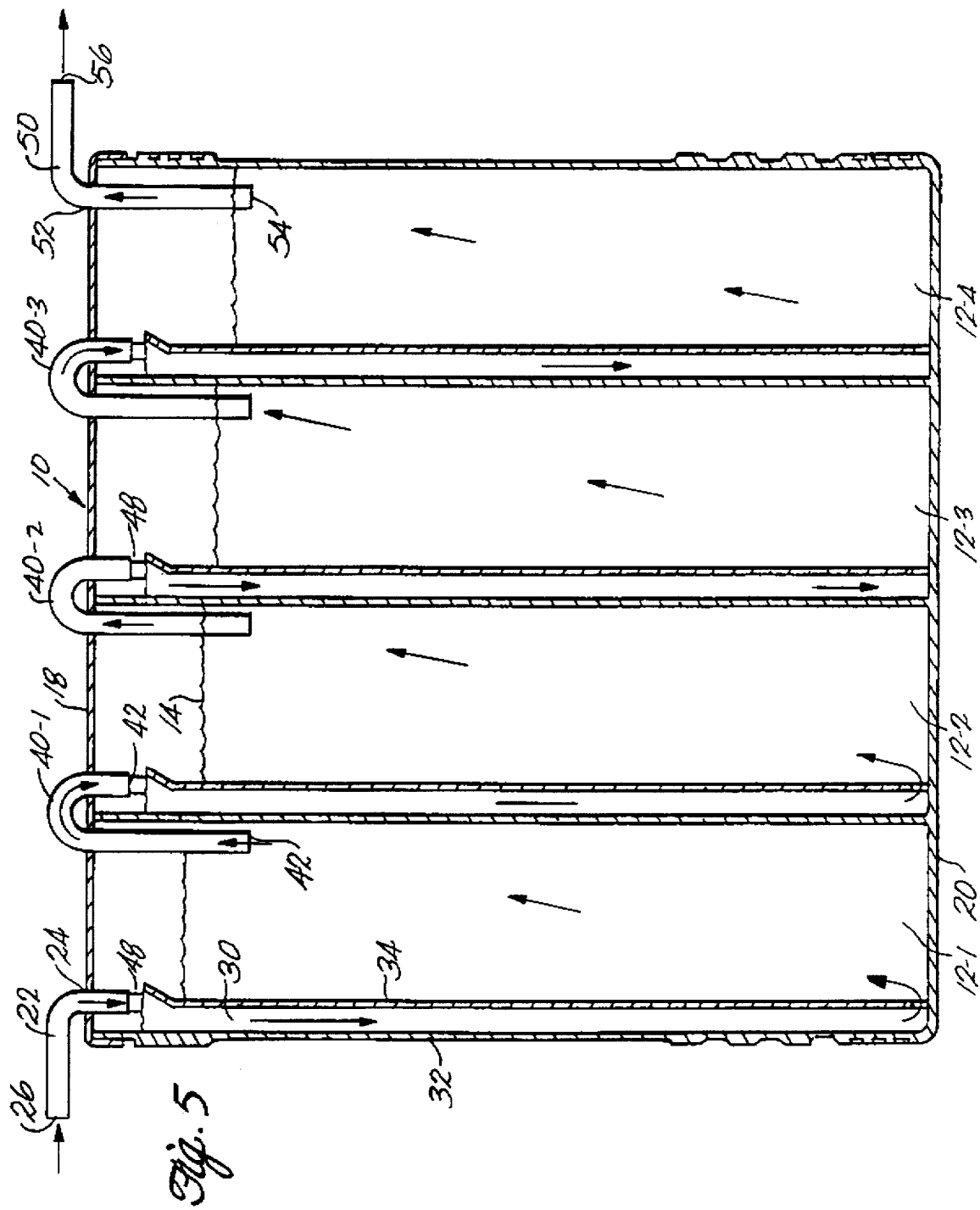

Referring now to FIG. 5, as the electrolyte continues to fill the first electrolytic cell 12-1, the electrolyte level will begin to approach the inlet end 42 of a first carry-over passage 40-1 which hydraulically connects the first cell with a second adjacent cell 12-2. When the electrolyte surface in cell 12-1 reaches the inlet end 42 of passage 40-1, the rising electrolyte surface begins to compress the gas in the gastight upper end of the cell. However, the pressure in adjacent cell 12-2 remains substantially unchanged. The level of the electrolyte surface in the inlet leg of passage 40-1 becomes higher than the level of the electrolyte surface in cell 12-1 outside passage 40-1. As introduction of electrolyte into cell 12-1 continues, the liquid level in passage 40-1 becomes sufficiently high that electrolyte begins to flow through passage 40-1 into cell 12-2. At that point, the level of electrolyte in cell 12-1 reaches a stable level between the upper end of transport channel 30 and the level of the lower end of the inlet leg of passage 40-1, and further flow of electrolyte into the battery then causes the level of the electrolyte in cell 12-2 to rise. The process is repeated in sequence in each of cells 12-2, 12-3, and 12-4 to cause each of those cells to be filled to a stable level in each cell at a point above the carry-over passage inlet or inlet opening to outlet port 50, as appropriate. Thereafter, continued introduction of electrolyte into the battery via inlet port 22 causes electrolyte to circulate through the battery and out of outlet port 50, as shown in FIG. 5.

The level of electrolyte in cell 12-1 remains constant during filling of cell 12-2 until the level in cell 12-2 reaches the inlet end of carry-over passage 40-2. As the liquid level in cell 12-2 begins to rise to compress gas in the top of that cell, the liquid level in cell 12-1 also rises slightly. At the point where liquid flow through passage 40-2 begins into cell 12-3, the level in cell 12-2 will be at an elevation equal to the liquid level in cell 12-1 during initial filling of cell 12-2, and the level in cell 12-1 will be above that in cell 12-2; that is true if, as preferred, the inlet ends of robe 40 and of outlet port 50 are all at a common level in the battery. It will be seen, therefore, that upon filling of the battery to a point where electrolyte flows through outlet 50, the respective cell liquid levels in the several cells will be as shown in FIG. 5 where the levels are lower in the cells proceeding from first cell 12-1 to last cell 124. The difference in electrolyte level for each cell is the inherent result of replenishing the battery electrolyte using hydraulic principles which depends upon a cumulative hydraulic pressure effect.

The pressure of electrolyte required at the inlet port to achieve filling of the several cells to the stable levels described above and shown in FIG. 5, is the sum of the effective electrolyte columns in the inlet legs of the several carry-over passages 40 and in the outlet port above the electrolyte levels in the cells from which they provide flow paths. That is a relatively low pressure which follows from the dimensions of the structures and arrangements present in the upper portions of the several cells.

The ability to transport the electrolyte between adjacent electrolytic cells by hydraulic principles through the carry-over passages avoids the need for using moving parts within each electrolytic cell, which effectively eliminates the potential for failure associated with such moving parts.

The introduction of electrolyte into the first cell may be terminated once the electrolyte is observed to be exiting the battery through the outlet port 50 in the last cell 12-4. Alternatively, the electrolyte exiting the battery may be collected to permit its circulation and reintroduction back into the first electrolytic cell.

Figure 6:
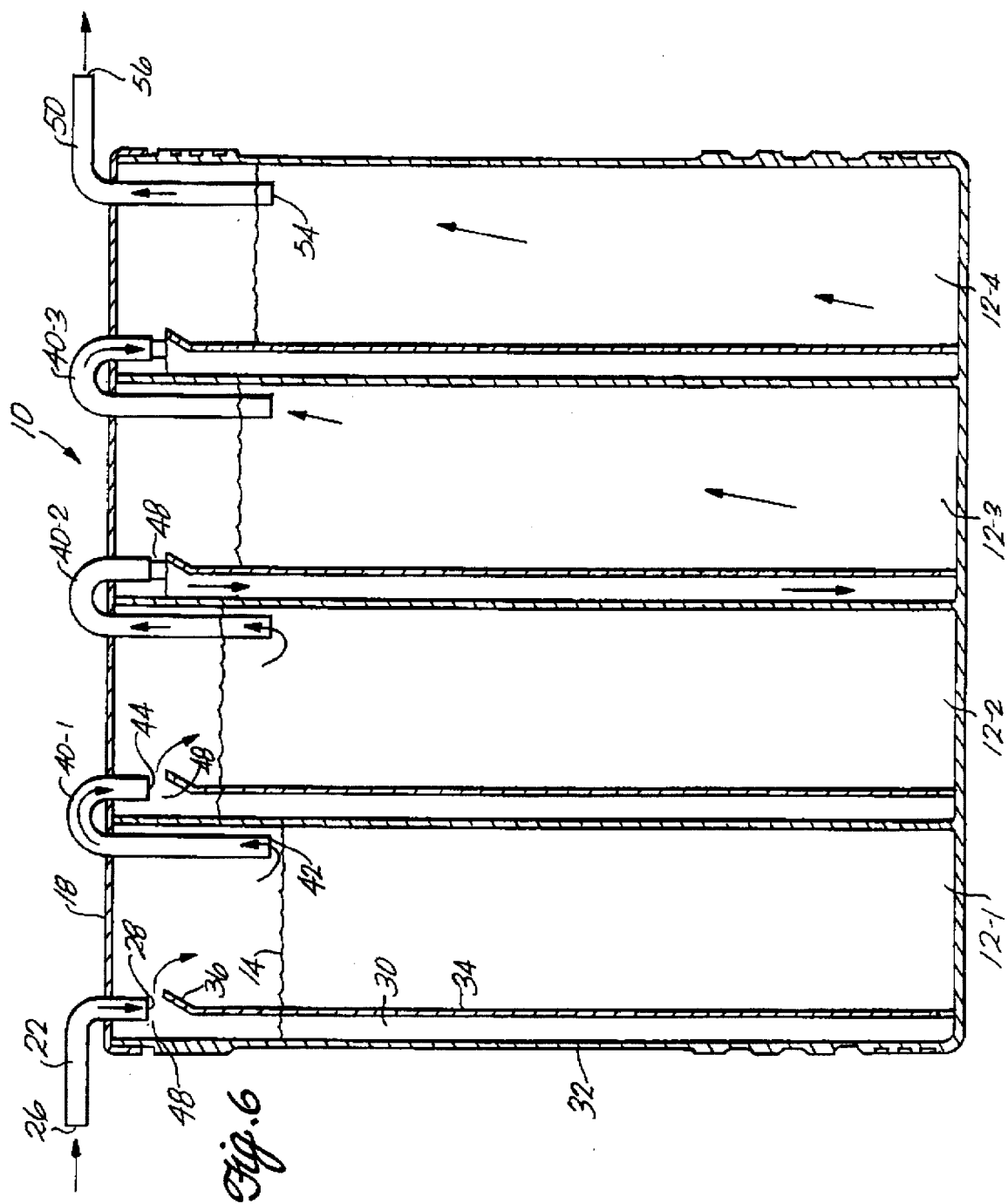
Figure 7:
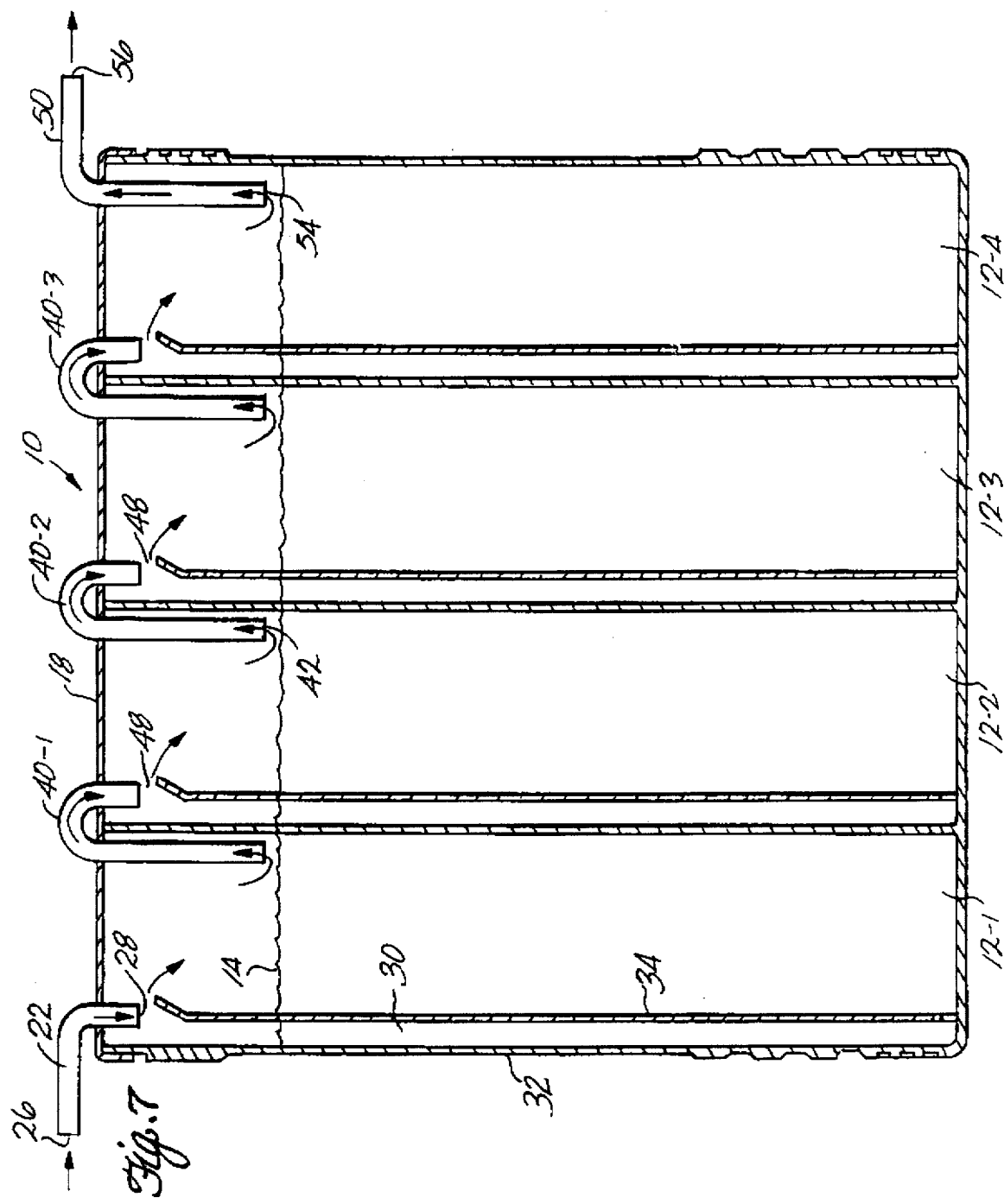

After the battery has been charged to a predetermined level and the electrolyte in the battery is completely homogeneous, the electrolyte replenishment and circulation operation may be terminated. The electrolyte levels in the several cells can be equalized to a predetermined level by an air purge operation according to methods of this invention. As shown in FIG. 6, air at a suitable pressure is introduced into port 22 and into the first electrolytic cell 12-1. The air exits the outlet end 26 of the inlet port, and flows into the portion of cell 12-1 which is above the electrolyte surface in that cell. In such flow, the air enters the top of the cell via air gap 48 which exists between the outlet end of the inlet port and the top end of channel 30 in cell 12-1. The air does not flow down the channel and up through the electrolyte in the cell. The air so introduced into cell 12-1 exerts pressure on the surface of the electrolyte. This air pressure causes the volume of electrolyte which lies above the inlet end 42 of carry-over passage 40-1 to be transported through the carry-over passage and into the second adjacent electrolytic cell 12-2. The electrolyte transport from the first to the second cell continues until the level of the electrolyte in the first cell drops to just below the inlet end 26 of the carry-over passage 40-1, at which time the air introduced into the first cell is transported through the carry-over passage and into the second cell 12-2.

The volume of electrolyte entering the second cell increases the head pressure of the electrolyte in the second cell causing the transport of the electrolyte through the second carry-over passage 40-2 and into the third cell 12-3 according to the same principles previously described for the electrolyte replenishing operation. Once the electrolyte level in the first cell drops below the inlet end 26 of the carry-over passage 40-1 and air begins to enter the second cell, that air enters directly into the upper portion of the second cell and exerts its pressure onto the surface of the electrolyte in cell 12-2 causing the volume of electrolyte present above the inlet end 26 of the second carry-over passage 40-2 to continue to pass through the second carry-over passage and into the third electrolytic cell 12-3. As in the first cell, the electrolyte transport from the second to the third cell will continue until the level of the electrolyte in the second cell drops below the inlet end 26 of the second carry-over passage 40-2, at which time the air introduced into the first cell and communicated into the second cell is communicated through the second carry-over passage 40-2 and into the third cell 12-3.

The air pressure effects and events which occurred in the first and second cells are repeated in succession in third cell 12-3 and in last cell 124. Assuming, as is preferred, that the openings to the carry-over passages 40 and to the outlet port 50 are located at a common elevation in battery 10, the result of the air pumping process is the condition shown in FIG. 7 where the liquid surfaces in the several cells are coplanar at that common elevation.

During this air pumping process the electrolyte moving through the several cells exits the battery through the outlet port 50 in the last cell. If desired this electrolyte can be collected and used for electrolyte replenishment according to this invention at a later date.

At the point where air is observed exiting the outlet port, the electrolyte in each electrolytic cell will have a level corresponding either to the location of the inlet end 42 of each carry-over passage 40, or to the location of the inlet end 54 of the outlet port 50. Accordingly, the lengths of either the carry-over passage inlet ends or the outlet pipe inlet end may be varied according to the level of electrolyte desired in each cell. In a preferred embodiment, the length of the inlet end should yield an electrolyte level that results in the complete immersion of the electrodes within each cell in order to maximize each cell's production of electricity through its participation in the electrochemical reaction.

A consequence of the air-driven liquid level equalizing (or adjusting) process described above is that the head spaces in the upper ends of the cells are purged of undesired or hazardous gases. Such gases can be vented to atmosphere or introduced to an air purification device such as a scrubber or the like as they leave the battery.

Alternatively, the air purge operation according to methods of this invention may also be carried out by reversing the flow of the air purge operation as previously described and introducing air into the outlet end 56 of the outlet port 50 and into the last electrolytic cell 12-4. This can be achieved by selecting a reversible pump to recirculate the electrolyte and by reversing the direction of the pump so that air is drawn through the electrolytic cells from the outlet port 50. In order to accommodate electrolyte level equilibration using this reverse air purge operation the length of each carry-over passage inlet and outlet end as well as the outlet port inlet end, shown in FIGS. 1, 5, 6 and 7, would have to be adjusted to both facilitate the hydraulic transport of the electrolyte during the replenishment and recirculation operations to establish the desired or working electrolyte level in each cell during the air purging operation. For example, in order to maximize the electrolyte level in each of the electrolytic cells 12 illustrated in FIGS. 1, 5, 6 and 7, it would be desirable to construct battery having an outlet end 28 of the inlet port 22, an inlet end 42 of each carry-over passage 40, an outlet end 44 of each carry-over passage and an inlet end 54 of the outlet port extending the same distance, preferably a short depth, into each electrolytic cell. Configured in this manner, each electrolytic cell would be filled completely, i.e., the electrolyte level would be near the battery cover 18, during the electrolyte replenishment operation. Conducting the reverse air purge operation in this embodiment would not result in a significant degree of leveling. Rather, the air purge operation would operate to clear the electrolyte solution from each of the carry-over passages 41, to eliminate any short circuit between adjoining electrolytic cells. Alternatively, the electrolyte level could be established at less than at maximum level by varying the distance that the outlet end 44 of each carry-over passage extends from the battery cover 18 into each electrolytic cell. Additionally, by using the reverse air purge operation one can obtain a different electrolyte level in the several cells than that obtained by using the standard air purge operation, for a set carry-over passage configuration.

The reverse air purge operation can also be carried out in a bipolar battery configured according to FIG. 4 without changing the battery configuration. The placement of the inlet end 42 of the carry-over passage 41, the inlet end 54 of the outlet port 50, and the air hole 47 permits the complete filling of each electrolyte cell, i.e., the electrolyte level would be near the battery cover 18, during the electrolyte replenishment operation. Conducting the reverse air purge operation in this embodiment, like the previously discussed embodiment, would serve to clear any residual electrolyte from each carry-over passage 41, to eliminate any short circuit between adjoining electrolytic cells. In either embodiment, the reverse air purge operation may be effected by using the same pumping means used for introducing electrolyte during the electrolyte circulation operation by simply reversing its operation and, thus eliminating the need for valving in the plumbing of the circulation system.

Collecting the electrolyte and circulating it back through the cells of the battery in the manner previously described is highly desirable when the battery is being charged to restore capacity. During the charging operation, a voltage is applied to the battery to induce current flow in the battery in a direction opposite to the direction in which current flows during discharge of the battery. That reverse current flow reverses the electricity-producing electrochemical reactions and restores the condition of active materials within the battery. At the point where the active materials within the battery are restored to a condition where their participation in the electrochemical reactions produces a desired discharge capacity of the battery, the battery is said to be at 100 percent charge. Ideally, the charging operation should terminate after achieving 100 percent charge. However, in order to maximize each cell's ability to participate in the electrochemical reactions and to store electricity, it is currently common practice to continue the charging operation by up to 30 percent beyond 100 percent charge. "Overcharging" the battery, as it is referred to in the trade, is an operation used to ensure the agitation and mixing of the electrolyte (i.e., to homogenize the electrolyte) within each electrolytic cell after 100 percent charge has been attained.

The homogenization of the electrolyte within each cell as a part of a charging operation is desirable because, as the battery is charged, the electrolyte within the cell is restored to a specific gravity indicating its ability to participate as desired in the electrochemical reaction productive of useful electrical energy. During the charging operation, localized "bodies" of electrolyte having either high or low specific gravities may develop within the electrolyte in each cell. Generally speaking, the specific gravity of the electrolyte corresponds to the state of charge of the electrolytic cell, e.g., an electrolytic cell comprising electrolyte having a specific gravity value of 1.3 exhibits a higher state of charge than an electrolytic cell comprising electrolyte having a specific gravity of 1.0. A battery exhibits maximum voltage capacity when each electrolytic cell is filled with a volume of homogeneous electrolyte, i.e., an electrolyte volume having a uniform specific gravity. Stratification of the electrolyte within each cell is not desired because it serves to reduce the voltage capacity of the battery. Therefore, in order to maximize the electricity producing potential of each cell, it is desired that each cell comprise an electrolyte volume having a uniform specific gravity. During the overcharge operation, the current entering the battery causes electrolysis of the water constituent of the acid electrolyte. (Electrolysis is the dissociation of water molecules into hydrogen and oxygen gas.) Electrolysis is intentionally produced by overcharging so that the hydrogen and oxygen which is formed on the electrodes in each cell will bubble up through the electrolyte volume and cause stirring and mixing of the electrolyte so that it becomes uniform throughout the cell.

Overcharging a battery is wasteful of energy and harmful to the battery, but is currently accepted as a necessary evil and tradeoff upon performance of the battery. Overcharging causes the battery to become hot; if overcharge current levels are high, hazardous "boiling-over" of the electrolyte can occur.

Heating of battery components beyond their designed temperature parameters effectively shortens the life of the battery. Also, during the overcharge operation, the positive electrode in a cell undergoes corrosion which effectively limits, in a progressive manner, the extent to which the battery can participate in the electrochemical reaction, and thus store electricity. It is estimated that the need to overcharge the battery to achieve electrolyte mixing may decrease battery life by up to fifty percent. The overcharging operation also results in gassing due to electrolysis. The electrolysis of the electrolyte not only produces potentially explosive gasses such as hydrogen but operates to decrease the electrolyte replenishment interval, making the need to replenish electrolyte more frequent. The practice of applying more energy to achieve overcharge and electrolyte mixing is both costly, in terms of the added cost associated with the electricity needed for overcharging, and time consuming, in terms of the extra time spent both during the overcharge operation and during electrolyte replenishing.

Accordingly, the advantages associated with eliminating the need to overcharge the battery during the charging operation are numerous. The life of a battery can be extended by both reducing the severe temperatures that adversely affect the battery's active materials, and by eliminating the electrode corrosion associated with overcharging. Eliminating electrode corrosion can result in a weight savings since the battery electrodes are largely made of lead and would no longer have to be sized to accommodate the progressive effects of overcharge corrosion. The generation of potentially explosive gasses can be eliminated or greatly reduced, and the electrolyte replenishment interval can be extended. Additionally, eliminating the need to overcharge will result in both a cost and a time savings associated with the overcharging operation itself.

Although overcharging the battery during the charging operation is not desirable, charging the battery a small amount beyond 100 percent charge is oftentimes necessary to overcome inefficiencies inherent in the charging operation, such as gassing which may occur before achieving 100 percent charge. Therefore, in order to restore the full reserve voltage capacity of a particular battery it may be necessary to charge the battery in the range of from 100 percent. A preferred amount of charging being in the range of 102 to 103 percent. This amount of charge is far short of the 30 percent over 100 percent charge that is known to be used to effect electrolyte agitation and cause the above mentioned undesirable side effects.

Recirculating the electrolyte through a battery in the manner described above during the charging operation avoids the need to overcharge. As shown in FIG. 5, as the electrolyte is continuously introduced into the first electrolytic cell 12-1, transported through each adjacent cell, transported out the outlet port 50, and circulated back into the first cell, it is being uniformly distributed within each cell and ultimately within the battery. This circulation operation effectively eliminates the need to overcharge because it results in each electrolytic cell having an electrolyte volume of uniform specific gravity, and thus maximizes the electricity producing potential of each cell. By eliminating the need to overcharge the battery, the circulation operation according to methods of this invention makes possible all of the previously mentioned advantages. The electrolyte circulation process may also include routing the electrolyte from the battery through a heat exchanger, radiator or the like for purposes of thermal management. During the charging operation the current entering the battery causes the battery to heat. As discussed previously, heating the battery adversely affects the active materials in the battery, and thus shortens the life of the battery. Accordingly, the ability to remove heat from the electrolyte by circulating it through a heat exchanger or the like serves to keep the battery's temperature within its design parameters during the charging operation, and thus maximize the useful life of the battery.

Additionally, it is well known that the performance of a battery is strongly influenced by ambient temperatures. Therefore, it can be desirable to circulate a battery's electrolyte through a heat exchanger or the like before its operation to ensure that the temperature of the battery is within design parameters. For example, when the ambient temperature is cold and below a battery's design parameters, the electrolyte can be circulated through a heat exchanger or the like to raise the temperature of the battery to design parameters. Conversely, when the ambient temperatures are hot and above design parameters, the electrolyte can be circulated through a heat exchanger or the like to lower the temperature of the battery to design parameters.

The battery electrolyte exiting the battery may also be stored in a reservoir or the like. During the normal discharge and charge cycles of an electrolyte battery, the battery active material flakes away from the surface of the electrode forming particulate matter that settles and collects along the bottom of each cell. Particulate matter that accumulates at the bottom of the electrolytic cells is referred to as "sediment" in the trade, while that which accumulates near the top of the cell is referred to as "moss" and that which accumulates about the sides of the cell is referred to as "tree shorts". This particulate matter is electrically conductive and thus may accumulate to a degree within the cell to bridge electrodes of opposite polarity, thus causing a short circuit and shortening the useful life of the battery.

It is, therefore, preferred that an electrolyte reservoir be configured to accommodate the physical separation of solid particulate matter from the electrolyte as the electrolyte is introduced into the reservoir, as in the course of circulating electrolyte through the battery. In a preferred arrangement, the reservoir can be a container configured in the shape of an hourglass. The constricted portion of the container should be of sufficient diameter to permit the passage of particulate matter. The inlet to the reservoir may be located above the constricted portion and the outlet from the reservoir can also be located above the constricted portion to ensure that the particulate matter accumulating below the constricted portion is not picked up and circulated back through the battery. Alternatively, the particulate matter contained in the circulating electrolyte may be removed outside of the reservoir by passing the electrolyte through a after or the like.

In addition, a reservoir may serve as the single location for conveniently adding make up water to the existing electrolyte and may comprise an indicator such as a line or the like that a user may conveniently refer to for determining whether such make up water should be added. The reservoir may be located to within the battery powered device or may be located within a structure where the battery powered device is stored. For example, the reservoir may reside within a battery powered car at a location that would facilitate easy access for purposes of adding water, such as locations currently occupied by automobile windshield washer and radiator reservoirs.

The electrolyte may be introduced to the battery during the electrolyte replenishment and circulation procedure according to this invention by using a fluid transport device such as a pump. The pump may be centrifugal, peristaltic or the like, and must be capable of facilitating the fluid transport of acidic electrolyte solutions such as sulfuric acid. In addition, the pump must be capable of handling the displacement of air as well as fluid during the air-powered electrolyte leveling and air purge procedures. The pump may be powered from the battery itself, or from an external power supply such as a battery charger or standard household voltage. The pump should be of sufficient capacity to provide a desired flow rate of electrolyte through the battery at a suitable pressure. Additionally, in order to accommodate the electrolyte level equilibration according to the alternative reverse air purge operation, it may be desirable that the fluid transport device be capable of inducing a vacuum through the battery by reversing its direction. A preferred fluid transport device is a peristaltic pump.

During the normal battery charging operation, some of the current introduced into the battery to restore the battery's discharge capacity results in the electrolysis of the water component of the battery electrolyte. This electrolysis results in the production of small amounts of hydrogen gas which may be explosive under certain conditions. It is desirable to remove this hydrogen gas from the battery in order to eliminate the potential for an explosion. The hydrogen gas, or any other gases produced during the charging operation, are purged from the battery by the air purge procedure which comprises transporting air through each of the electrolyte cells of the battery as described above. By using the air purge procedure to sweep unwanted gasses out of the battery the unwanted gasses can be collected and disposed of by appropriate means. In the case of hydrogen gas, the air exiting the battery may simply be collected and vented to the atmosphere. However, in the case of other gases which may be hazardous or toxic, the air exiting the battery may be routed through an air purification device such as a filter, scrubber or the like to remove the hazardous or toxic gases, routed through a catalytic convertor to form water, or simply routed away from the working area and vented to the atmosphere.

Figure 8:
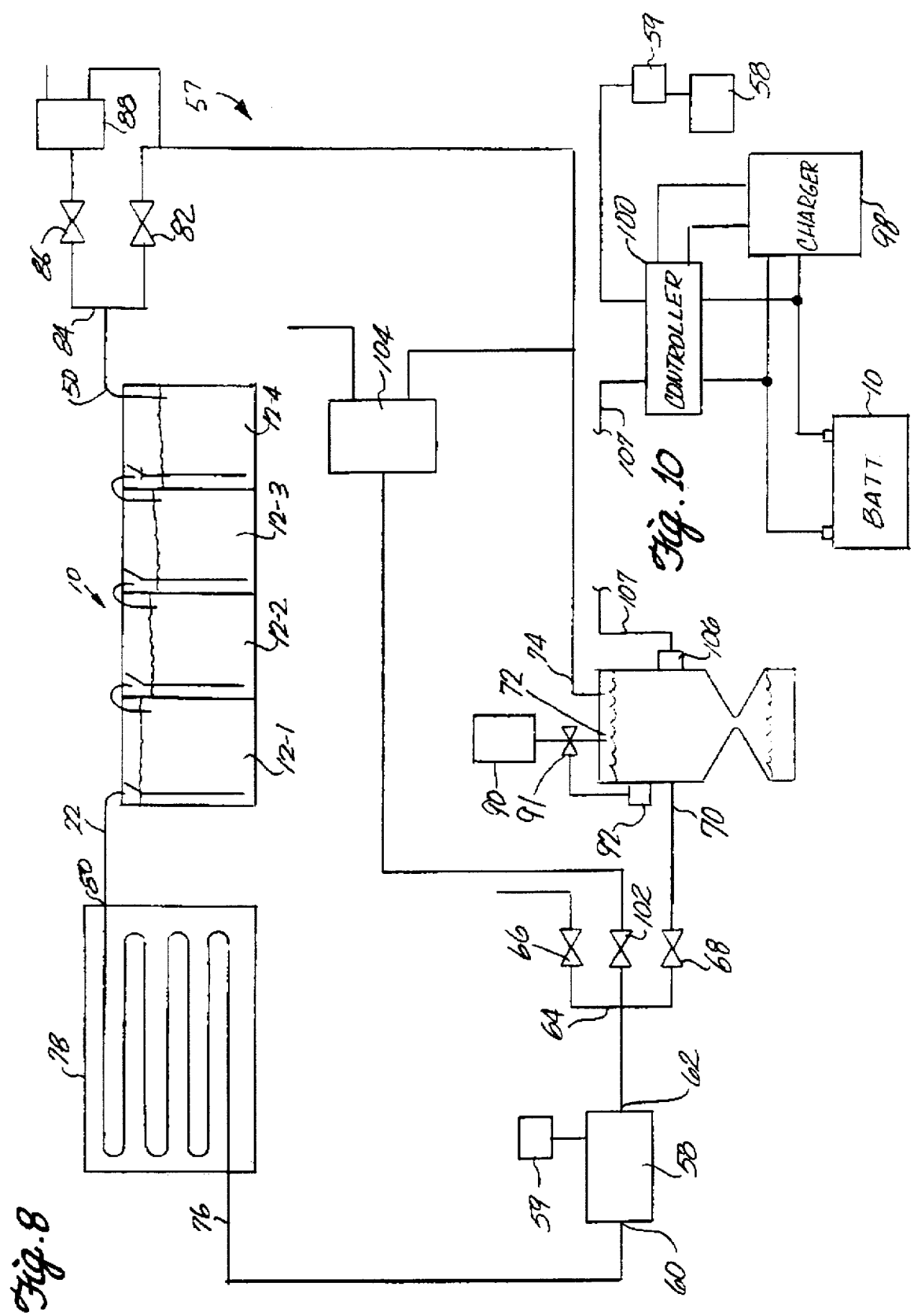
FIG. 8 is a schematic diagram of an embodiment of a electrolyte conditioning, replenishment and circulation system.

FIG. 8 shows an exemplary and preferred embodiment of an electrolyte circulation system 57 according to the present invention. The circulation system includes the electrolyte battery, as previously concerning FIG. 1, configured to accommodate both electrolyte replenishment by hydraulic means and electrolyte level equilibration by hydraulic and pneumatic means. A pump 58 of the type previously described is positioned at a location in a circulation loop between the inlet port 22 and the outlet port 50 of the battery 10. The pump is powered by a pump motor 59. A pump outlet 60 is connected by tubing and the like to the inlet end of a heat exchanger 78 of the type previously described. An outlet end 80 of the heat exchanger is attached by tubing and the like to the inlet end of the inlet port 22. A pump inlet 62 is attached to an inlet manifold 64 comprising an air inlet valve 66 and an electrolyte inlet valve (58. Alternatively, a single valve may be used that is capable of switching between electrolyte and air connections.

An inlet end of the electrolyte inlet valve 68 is connected through tubing and the like to an outlet 70 of an electrolyte reservoir 72 of the type previously described. The reservoir outlet 70 is below a minimum reservoir electrolyte level and above the constricted portion of the reservoir. A reservoir inlet 74 is positioned near the top of the reservoir and is connected by tubing and the like to the outlet end of an electrolyte outlet valve 82. The electrolyte outlet valve is connected to an outlet manifold 84. An inlet end of the air outlet valve 86 is also attached to the outlet manifold. An outlet end of the air outlet valve 86 can be attached by tubing and the like to an air purification device. If desired, however, the outlet end of the air inlet valve may simply be vented to the atmosphere. The outlet manifold 84 is attached by tubing and the like to the battery outlet port 50.

Preferably, as shown in FIG. 8, there is associated with the electrolyte reservoir 72 a water reservoir 90 which discharges to the electrolyte reservoir via a valve 91, the operation of which is controlled by the output of a level sensor 92. The level sensor is mounted to the electrolyte reservoir to cause water to be added to the electrolyte, and to restore the electrolyte volume in the system to a desired volume, when the mount of electrolyte in reservoir 72 becomes too small to accommodate system electrolyte volume loses due to evaporation and electrolysis of the water in the electrolyte.

In a preferred embodiment, the electrolyte replenishment and circulation procedure according to this invention can be initiated by closing the air inlet valve 66 and opening the electrolyte inlet valve 68 to permit the passage of electrolyte from the electrolyte reservoir 72 to the inlet of the pump 58. The pump is turned on to cause the transport of electrolyte through the heat exchanger 78. The electrolyte enters the heat exchanger 78 and is either cooled or heated depending on whether the battery is being charged or whether the electrolyte temperature is being adjusted to ensure maximum performance at the prevailing ambient temperature. The electrolyte is circulated through the heat exchanger 78 and is routed through the battery inlet port 22 and into the first electrolyte cell of the battery 10. The pump continues to introduce electrolyte into the first cell causing the hydraulic transport of the electrolyte through the battery, filling each cell in the manner previously described.

After the last electrolytic cell is filled, the electrolyte exits the battery through the battery outlet port 50 and enters the outlet manifold 84. In the electrolyte circulation procedure, the air outlet valve 86 is closed and the electrolyte outlet valve 82 is open to facilitate the transfer of electrolyte to the electrolyte reservoir 72 where any particulate matter contained in the entering electrolyte is allowed to settle out and pass through the constricted portion of the reservoir to the bottom of the reservoir where it can not again be picked up and circulated back through the battery.

The electrolyte circulation process may be conducted throughout battery charging procedures to ensure that each electrolytic cell has a homogeneous electrolyte volume of the desired temperature and uniform specific gravity throughout each cell. If desired, the electrolyte may be circulated for a time beyond the charging period to ensure that the temperature of the battery is within the predetermined design parameters, and to ensure the removal of particulate matter entrained in the electrolyte.

The air pumping procedure used to equilibrate the electrolyte levels in the several battery cells according to the present invention may be initiated by closing the electrolyte inlet valve 68 and opening the air inlet valve 66, thus causing air to pass through the pump 58, through the heat exchanger 78 and into the battery via the inlet port 22. As the air is introduced into the battery the electrolyte in each electrolytic cell will be leveled according to previously described principles of this invention. The electrolyte outlet valve 82 is closed and the air outlet valve 86 is opened to permit the flow of electrolyte and air exiting the battery to enter a suitable liquid/gas separation device 88 where the air exiting the battery can be separated and either vented or collected and treated.

The air purging operation may be conducted after each replenishment/circulation operation to equilibrate the electrolyte level in each electrolyte cell. The duration of the air purge operation may continue beyond the point where air is observed exiting the outlet port 50 of the battery in order to sweep any hazardous gases out of the battery where they can be properly treated.

The electrolyte circulation system described permits the "conditioning" of the electrolyte. Electrolyte conditioning refers to the process of mixing the electrolyte within the battery so that the battery comprises a homogeneous electrolyte volume of uniform specific gravity. Electrolyte conditioning also refers to the process of adding make up water to the existing battery electrolyte to adjust the specific gravity value of the electrolyte to a predetermined range representing optimal participation in the electrochemical reaction producing electricity.

It is to be understood that the electrolyte circulation system described above and illustrated in FIG. 8 is only a preferred embodiment according to the methods and principles of this invention. Other types of circulation systems may be used to carry out the practice of this invention. The circulation system need not comprise all of the devices illustrated in FIG. 8, and it need not comprise the devices in the same manner or order as illustrated in FIG. 8. For example, a circulation system comprising a pump, reservoir, and heat exchanger may combine these devices in an order other than that illustrated in FIG. 8.

Additionally, the electrolyte circulation system may be accomplished according to principles of this invention by, instead of pumping electrolyte under positive pressure, using a vacuum to draw the electrolyte solution through each of the electrolytic cells within the battery. In such an embodiment, the pump 58 in FIG. 8 could be positioned with its inlet 62 attached to the outlet port 50 and its outlet 60 configured to discharge into the reservoir 72. The reservoir outlet 70 could be connected to the inlet port 22. Operating the pump would cause the vacuum circulation of electrolyte in the reservoir throughout each electrolytic cell. This method of vacuum electrolyte circulation may present certain advantages over using a positive pressure electrolyte circulation system, due mainly to eliminating the hazards that may be associated with an acid leak in a positive pressure acid-transport system.

Additionally, instead of using positive air pressure to equilibrate the electrolyte levels in the several battery cells, the leveling operation can be performed by using a vacuum according to an alternative reverse air purge operation. As shown in FIG. 8, the reverse air purge operation can be initiated by reversing the direction of the pump 58, closing the electrolyte inlet valve 68, closing the air inlet valve 66, opening an air outlet valve 102, closing the electrolyte outlet valve 82, and opening the air outlet valve 86. As the air is drawn through the battery outlet port 50 into the battery the electrolyte in each electrolytic cell will be leveled according to previously described principles of this invention. Additionally, each carry-over passage will be purged of electrolyte and filled with air, eliminating the possibility of electrical short circuits between adjacent cells. The air leaving the battery travels through the battery inlet port 22, the heat exchanger 78, through the pump 58, through the air outlet valve 102, and into a suitable liquid/gas separation device 104 where the air exiting the battery can be separated and either vented or collected and treated.

Additionally, the electrolyte circulation system of the present invention may be configured to circulate the electrolyte throughout the electrolytic cells in a battery in a parallel-series manner in order to accommodate a large pressure drop associated with a battery having a large number of electrolytic cells. For example, in a large application calling for a battery having 250 electrolytic cells, the battery may be configured having 10 parallel circulation systems for circulating electrolyte through 25 electrolytic cells in serial fashion. In such an embodiment, each parallel circulation system would have its own pump that would pick up electrolyte from a common reservoir. The electrolyte exiting the final electrolytic cell in each parallel circulation system would be collected in the common reservoir and, thus facilitate the homogenization of the electrolyte solution throughout each of the electrolytic cells in the battery.

The methods of replenishing, circulating and adjusting the level of the battery electrolyte according to methods of this invention has been specifically described and illustrated in the context of a lead-acid electrolytic battery of conventional construction comprising four electrolytic cells for purposes of illustration and clarity. It is, therefore, to be understood that the methods according to this invention apply to liquid electrolyte batteries using other electrochemical materials or comprising any number of electrolytic cells. Also, as shown below with reference to FIG. 4, the structural and procedural aspects of this invention can be practiced to advantage with liquid electrolyte bipolar batteries.

A test was conducted using a lead-acid battery comprising three electrolytic cells, constructed according to principles of this invention, to determine the effectiveness of the circulation system in distributing the electrolyte through the electrolyte battery during a charging operation.

The useable voltage capacity of the three cell battery was completely discharged and the battery was connected to a constant current charger. A tube was inserted into beaker containing fresh electrolyte solution having a specific gravity of approximately 1.28. The other end of the tube was connected to the inlet of a peristaltic pump. The outlet of the pump was connected to an inlet end of an inlet port of the battery constructed consistently with the foregoing description of battery 10 shown in FIGS. 1-3. Prior to commencing the charging operation, specific gravity measurements were taken in each electrolytic cell and were measured to be approximately 1.16. The charging and the electrolyte replenishment and circulation operations were commenced concurrently, and specific gravity measurements were taken in each electrolytic cell at one hour intervals. Measurements of the specific gravity of the electrolyte in the beaker (reservoir) were made more frequently.

Figure 9:
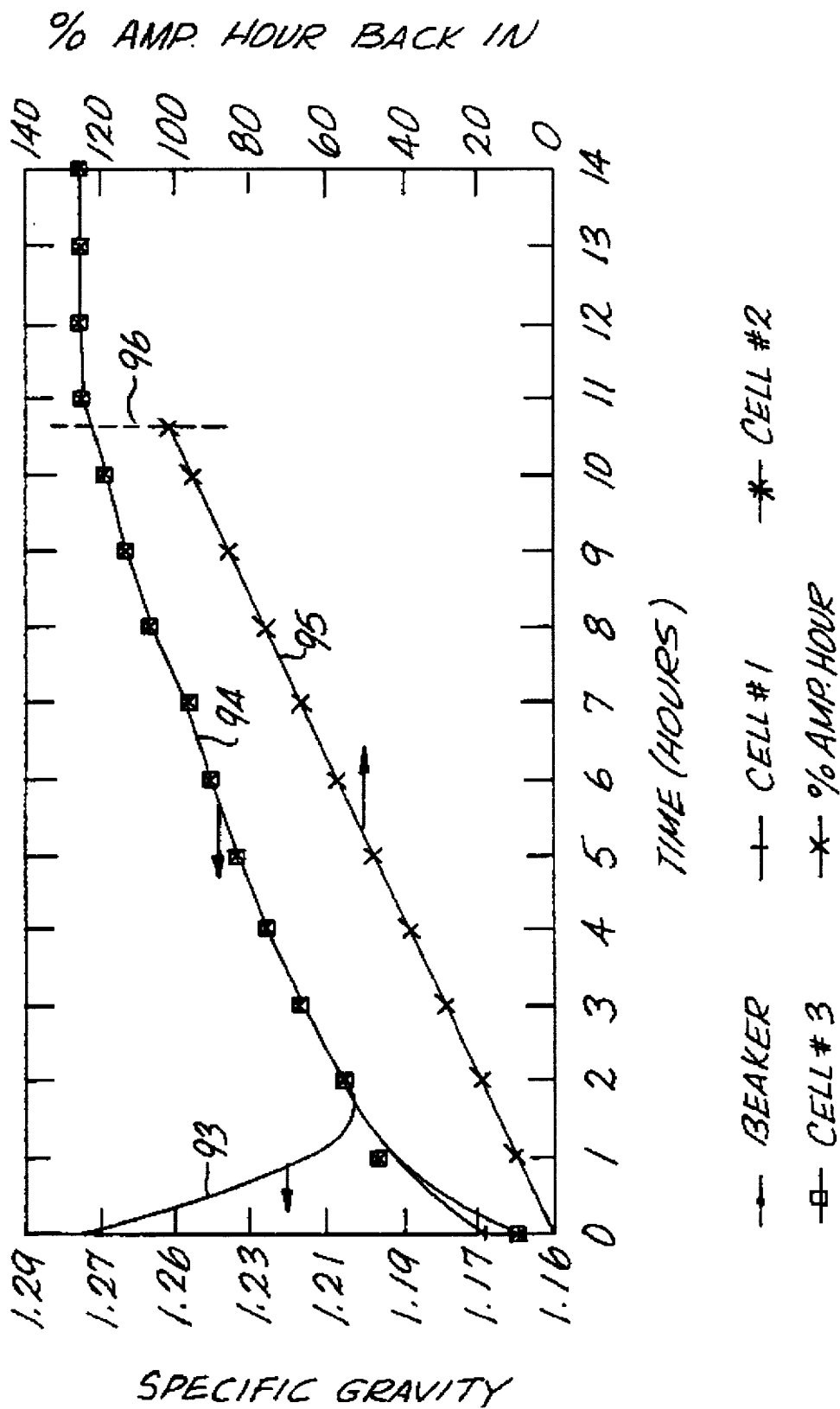
FIG. 9 is a graph that describes the electrolyte condition in a test battery at different times during a charging operation where the electrolyte is circulated according to principles of this invention.

As shown in FIG. 9, the specific gravity in each electrolytic cell began to rise as the electrolyte in the beaker circulated through the test battery and the battery began to charge. After approximately two hours of charging, specific gravity measurements made in each cell and in the beaker showed that the electrolyte specific gravity had become uniform throughout the system. The specific gravity of the electrolyte in each electrolytic cell continued to rise uniformly as the charging and circulation operations proceeded. After ten and one half hours the voltage capacity of the battery was restored (103 percent charging) and the charging and circulation operation was completed. Restoration of full charge to the battery was signalled when the electrolyte's specific gravity ceased to increase and reached a predetermined full charge specific gravity value. Also, the ampere-hours of battery discharge before commencement of the test was known, and full charge existed when discharge and charge ampere-hours became equal.

In FIG. 9, curve 93 describes the specific gravity of electrolyte in the beaker, the curves grouped at 94 describe the specific gravity in the several battery cells, and curve 95 describes the charging energy (in ampere-hours) applied to the battery. Line 96 denotes the point at which the battery was restored to a condition of full charge.

The measurement of uniform specific gravity values in each electrolytic cell during the charging and circulation operation evidenced the effectiveness of the electrolyte circulation operation in distributing the electrolyte throughout the battery, thus eliminating the need to overcharge the battery to achieve electrolyte mixing and homogeneity.

In order to ensure charger cut off after the battery has achieved full charge, i.e., 103 percent charge, and prevent or guard against undesirable overcharge, i.e., greater than 110 percent charge, a control device can be incorporated into the charging system. FIG. 10 shows a schematic of such a charging system comprising a battery 10, a battery charger 98, and a charger controller 100 capable of shutting off the charger after full charge is detected. The controller may be of the type that measures the change in voltage as a function of time or measures the total amount of ampere hours charged.

A controller that measures the total ampere-hours discharged and charged can be programmed to shut off the charger after the charger puts into the battery the same amount of ampere-hours removed from the battery during discharge plus some small predetermined overcharge to compensate for any losses or inefficiencies, thus effectively protecting against overcharge.

A controller that measures the change of voltage as a function of time can be programmed to shut off the charger when it no longer senses a change in voltage as a function of time. At the point of 103 percent charge, the voltage applied to the battery will no longer result in increasing the batteries discharge potential and the battery voltage will remain constant. Therefore, a controller programmed to sense a lack of voltage change with time and to shut off the charger will effectively prevent overcharge.

Alternatively, as shown in FIGS. 8 and 10, the charger controller 100 can be configured to deactivate the battery charger 98 depending on the specific gravity value of the electrolyte in the reservoir 72. A specific gravity sensor 106 can be positioned within the reservoir and electrically connected to relay specific gravity information to the controller via a lead 107. As shown in FIG. 9, as the charging energy of the battery increases, so does the specific gravity of the battery electrolyte. When the battery is restored to full charge 96 the change in specific gravity as a function of time is essentially zero. Accordingly, the controller can be designed to deactivate the charger a predetermined amount of time after the specific gravity of the battery electrolyte no longer increases as a function of time to ensure that the battery has achieved full charge, i.e., 103 percent charge, and prevent or guard against undesirable overcharge, i.e., greater than 110 percent charge. The controller 100 may also be configured to deactivate the pump mower 59 during the electrolyte charging and circulation operation when it senses that the specific gravity of the battery electrolyte no longer increases as a function of time.

The method of circulating the electrolyte according to principles of this invention has specifically described as occurring concurrently with the charging operation. However, it is to be understood that the electrolyte circulation may be conducted at different times during the charging operation, or may be conducted independent from the charging operation, i.e., after the charging operation has concluded. Tests were conducted to determine whether the circulation operation could be conducted at a time after the commencement of the charging operation in order to minimize both the pump requirements and the energy consumed by circulating the electrolyte during the entire charging operation.

In one such test, it was discovered that initiating the circulation operation ¼ of the way into the charging operation produced a homogeneous electrolyte volume throughout the battery having a specific gravity at the completion of the charging operation equal to that realized when the circulation operation proceeded concurrently with the charging operation. In another such test, the electrolyte circulation was initiated ¾ of the way into the charging operation. Like the previous test, it was discovered that initiating the electrolyte circulation ¾ of the way into the charging operation produced a homogeneous electrolyte volume throughout the battery having a specific gravity equal to that realized when the circulation operation proceeded concurrently with the charging operation. Theses test results provide evidence that the circulation operation of this invention need not be conducted during the entire charging operation in order to provide electrolyte homogenization; therefore, allowing a user to minimize the pump requirements and the energy consumed during the circulation operation.

The construction and procedural aspects of the battery and related electrolyte replenishing/conditioning system according to principles of this invention have numerous advantages which would help overcome any perceived inconveniences or financial encumbrances associated with replacing traditional hydrocarbon power sources with environmentally desirable battery powered sources in such applications as the automobile. Practice of this invention can: (1) permit the replenishment of the battery electrolyte to a desired electrolyte level in each cell without the use of moving pans within the battery and from a single convenient location; (2) increase the electrolyte replenishment frequency due to the ability to circulate the electrolyte, eliminating the need to overcharge the battery, and thus reducing the amount of electrolyte lost due to water hydrolysis; (3) permit the removal of particulate active material from the electrolyte, eliminating the potential for electrical short circuit within the battery; (4) increase the life of the battery by circulating the battery electrolyte through a temperature management device to maintain internal battery temperatures within design temperature parameters both during the charging and prior to discharge of the battery; (5) increase the life of the battery by circulating the electrolyte during charging, eliminating the need to overcharge the battery, and thus eliminating corrosion which occurs at the positive electrode plate; (6) save energy by eliminating the need to apply a voltage to the battery in excess of that needed to achieve 100 percent charge; (7) save time by eliminating the need to charge the battery beyond the time associated with achieving 100 percent charge; and (8) promote safety by, a) permitting a user to replenish the battery electrolyte in a manner that would avoiding placing the user in contact with the acidic solution, b) reducing the amount of potentially explosive gaseous hydrolysis products created during the charging process by replacing the need to overcharge with electrolyte circulation, and c) removing potentially explosive gases from the battery by air purging during the charging operation.

The foregoing description of presently preferred and other aspects of this invention has been presented by way of illustration and example. It does not present, nor is it intended to present, an exhaustive catalog of all structural and procedural forms by which the invention can be embodied. Variations upon and alterations of the described structures and procedures can be pursued without departing from the fair substance and scope of the invention consistent with the foregoing descriptions, and the following claims which are to be read and interpreted liberally in the context of the state of the art from which this invention has advanced.

What is claimed is:

1. A flooded electrolyte secondary storage battery which comprises:

a plurality of cells having coplanar tops and coplanar bottoms;

an electrolyte transport channel extending substantially vertically in each cell from an upper end proximate the cell top to a lower end proximate the cell bottom;

a gas and liquid inlet port into a top portion of a first one of the cells for discharging liquid introduced thereinto no an upper end of the transport channel in that cell;

fluid carry-over passages connecting the first cell, a last one of the cells and all remaining cells of the plurality, each carry-over passage having an inlet end at a selected level in the cell in which the inlet is located and an outlet end in a different cell at a location selected for discharging liquid flowing through the outlet end to the transport channel in that different cell, each carry-over passage being independent of each other one and communicating between only two cells; and a gas and liquid outlet port to the exterior of the battery from the top portion of the last cell, the outlet port having an entry opening at a selected level in the last cell, the selected level in each cell being at or below the upper end of the transport channel for that cell.

2. A flood electrolyte storage battery as recited in claim 1 wherein the transport channels, inlet port, carry-over passages, and outlet port comprises no moving parts.

3. A system for replenishing and circulating electrolyte in a liquid electrolyte secondary battery, the system comprising:

an electrolyte transport channel extending vertically in each of a plurality of electrolytic cells from an inlet end near a top of the cell to an outlet end near a bottom of the cell, the tops and bottoms of all cells being coplaner with one another;

an inlet port extending from a position outside a battery to a position within a first one of the electrolytic cells;

an outlet port extending from a position within a last one of the electrolytic cells to a position outside the battery;

a fluid carry-over passage extending between and hydraulically connecting the upper ends of each adjacent set of cells and providing a portion of serial fluid flow path from the first cell to the last cell via all other cells, each transport channel receiving electrolyte introduced to its cell via the respective one of the inlet port and the carry-over passages, each carry-over passage being independent of each other carry-over passage and communicating between only two cells; and means for introducing an electrolyte solution into the inlet port.

4. An electrolyte replenishing and circulation system as recited in claim 3 wherein the inlet port comprises a passage extending through an upper cell boundary to a passage outlet end over the opening to the transport channel residing in the first electrolytic cell.

5. An electrolyte replenishing and circulation system as recited in claim 3 wherein each carry-over passage has an inlet end and an outlet end and extends through an upper cell boundary, the inlet end of each carry-over passage extending into a cell to a location corresponding to a working level of electrolyte in the cell.

6. An electrolyte replenishing and circulation system as recited in claim 3 wherein the means for introducing the electrolyte solution comprises a pump having an inlet and an outlet, the pump inlet being connected to the outlet port and the pump outlet end being connected to the inlet port.

7. An electrolyte replenishing and circulation system as recited in claim 6 wherein a heat management device is connected in series with the pump.

8. An electrolyte replenishing and circulating system as recited in claim 7 wherein the heat management device is connected between the outlet port and an electrolyte reservoir located upstream of the pump.

9. An electrolyte replenishing and circulation system comprising;

an inlet port comprising a passage extending from a location outside an electrolyte battery, through an upper cell boundary, and into a first electrolytic cell:

an outlet port comprising a passage extending from a position within a last electrolytic cell, through the upper cell boundary, to a position outside of the battery;

a plurality of transport channels, each transport channel extending vertically in each electrolytic cell, each transport channel comprising a flared portion at one end near the top of the cell and a channel opening near a bottom of the cell;

a plurality of carry-over passages, each carry-over passage having an inlet end and an outlet end, the inlet end and outlet end of each carry-over passage extending through the upper cell boundary and into adjacent electrolytic cells to hydraulically connect each cell, each transport channel receiving electrolyte introduced to its cell via the respective one of the inlet port and the carry-over passages, the position of the inlet end of the carry-over passage within each electrolytic cell defining a working electrolyte level in the cell; and means for introducing an electrolyte solution into the electrolyte battery.

10. An electrolyte replenishing and circulation system as recited in claim 9 wherein an outlet end of the inlet port and the outlet end of each carry-over passage is positioned adjacent to the electrolyte transport channel within each electrolytic cell such that an air gap is formed between the two.

11. An electrolyte replenishing and circulation system as recited in claim 10 wherein the position of an inlet end of the outlet port defines the electrolyte level in the last electrolytic cell.

12. An electrolyte replenishing and circulation system as recited in claim 9 comprising means for cooling the electrolyte introduced into the electrolyte battery.

13. A method for establishing working levels of liquid electrolyte in each of the cells of a multi-cell liquid electrolyte storage battery, the method comprising the steps of:

providing in each cell a fluid flow passage extending from an upper end above a working cell electrolyte level to an open lower end proximate a bottom of the cell;

providing fluid flow interconnections between all of the cells each of which interconnections has an inlet at the working level in one of two cells interconnected by it and an outlet associated with the upper end of the flow passage in the other cell interconnected by it, each cell being gas-tight except for the flow interconnection from it;

pumping electrolyte into a first one of the cells to the flow passage in the first cell and from the first cell to a last cell via the flow interconnections and from the last cell through an outlet having an entrance opening at the working level in the last cell to fill each cell with electrolyte at least to the working level in each cell; and pumping air into the inlet and through the several cells to the outlet to adjust the electrolyte level in each cell to the working level in each cell.

14. The method according to claim 13 including the further steps of charging the battery and of pumping electrolyte through the battery during performance of the charging step.

15. The method according to claim 13 including the further steps of charging the battery and commencing performance of the step of pumping electrolyte during a terminal portion of the battery charging operation and continuing the pumping of electrolyte at least until the end of the charging operation, and performing the step of pumping air after completion of the charging operation.

16. The method according to claim 13 including performing the steps of pumping electrolyte and of pumping air substantially upon completion of a further step of charging the battery.

17. The method according to claim 14 including the further step of terminating performance of the charging step substantially upon the battery attaining a state of full charge.

18. The method according to claim 17 including the step of terminating performance of the electrolyte pumping step substantially concurrently with terminating performance of the charging step.

19. A method for replenishing and circulating electrolyte through electrolytic cells of a liquid electrolyte secondary battery, the method comprising the steps of:

introducing an electrolyte solution into a first electrolytic cell of the battery;

hydraulically transporting the electrolyte solution through the first electrolytic cell via intercell flow passages to a plurality of hydraulically serially connected electrolytic cells that are coplant with one another until each cell is filled;

circulating the electrolyte through the plurality of electrolytic cells; and adjusting the level of electrolyte solution in each electrolytic cell to a working level by circulating air through each of the electrolytic cells via the intercell flow passages.

20. The method as recited in claim 19 comprising the further step of charging the battery during the step of transporting the electrolyte through the plurality of cells.

21. The method as recited in claim 17 comprising the further step of thermally conditioning the circulated electrolyte.

22. The method as recited in claim 19 comprising the further steps of collecting the circulated electrolyte in a reservoir and removing particulate matter from the electrolyte.

23. The method as recited in claim 19 comprising circulating air through the path used for introducing electrolyte into each cell, the air being circulated through the battery in a direction which is the reverse of the electrolyte introduction into the first cell and of transport of the electrolyte between cells.

24. The method as recited in claim 23 comprising providing a pump for circulating electrolyte and circulating air through the battery, and operating the pump in one direction to pump electrolyte and in an opposite direction to pump air.

25. A flooded electrolyte secondary battery which includes a plurality of cells each having a top and a bottom, and a substantially planar cover closing the tops of the cells, the battery comprising:

an electrolyte transport channel extending substantially vertically in each cell from an upper end proximate the cover to a lower end proximate the cell bottom;

a gas and liquid inlet port extending from outside of the battery through the cover into a top portion of a first one of the cells for discharging liquid introduced thereinto to an upper end of the transport channel in that cell;

carry-over passages connecting the first cell, a last one of the cells and all remaining cells of the plurality in series liquid flow relation, each carry-over passage having an inlet end at a selected level in the cell in which the inlet is located and an outlet end in a different cell, wherein the inlet end for each carry-over passage is below its outlet end, and wherein the outlet end of each carry-over passage is at a location selected for discharging liquid flowing through the outlet end to the transport channel in that different cell; and a gas and liquid outlet port extending from outside of the battery through the cover to the top portion of the last cell, the outlet port having an entry opening at a selected level in the last cell, the selected level in each cell being at or below the upper end of the transport channel for that cell.

26. A flooded electrolyte secondary battery as recited in claim 25 wherein the carry-over passages extend above the cell tops between adjacent cells.

27. A flooded electrolyte secondary battery as recited in claim 25 wherein the inlet end of each carry-over passage and an inlet end of the liquid outlet port each extend into respective cells at equal levels to effect electrolyte leveling by the serial movement of air through the plurality of cells via those passages.

28. A method for charging a liquid electrolyte secondary battery, the method comprising the steps of:

introducing an electrical current into the battery;

circulating the electrolyte serially through electrolytic cells of the battery during at least during a terminal portion of the charging process; and equalizing the level of electrolyte in each electrolytic cell by serial air movement through the cells.

29. A method as recited in claim 28 wherein, during the step of circulating the electrolyte, the electrolyte is circulated in a manner which causes mixing of electrolyte to substantial homogeneity in each cell.

30. A method as recited in claim 28 further comprising the step of adjusting the temperature of the battery during the charging process.

31. A method as recited in claim 28 further comprising the step of purifying the electrolyte during the step of circulating the electrolyte.

* * * * *

UNITED STATES PATENT AND TRADEMARK OFFICE
CERTIFICATE OF CORRECTION

PATENT NO. : 5,543,243
DATED : August 6, 1996
INVENTOR(S) : William B. Brecht

It is certified that error appears in the above-indentified patent and that said Letters Patent is hereby corrected as shown below:

Column 1, line 29, change "(PbO2)" to -- (PbO$_2$) --.
Column 2, line 60, after "measure" insert -- of --.
Column 3, line 41, before "conventional" insert a parenthesis.
Column 5, line 20, after "embodiment of" change "a" to -- an --.
Column 7, line 8, Replace " passage 413" with -- passage 40 --.
Column 8, line 22, replace " cell 124" with -- cell 12-4 --.
Column 9, line 31, change "predetermined of" to -- predetermined or --.
Column 10, line 16, replace "robe 40" with -- tube 40 --.
Column 10, line 22, replace "cell 124" with -- cell 12-4 --.
Column 11, line 29, replace "cell 124" with -- cell 12-4 --.
Column 12, line 9, after "construct" insert -- a --.
Column 12, line 20, replace "passages 41" with -- passages 40 --.
Column 12, line 28, after "operation" delete the comma.
Column 12, lines 34,40, replace "passage 41" with -- passage 40 -- (both occurrences).
Column 14, line 6, change "Will" to -- will --.
Column 14, line 14, replace "100 percent" with -- 100 to 110 percent --.
Column 14, line 18, change "above mentioned" to -- above-mentioned --.
Column 15, line 21, replace "after" with -- filter --.
Column 16, line 24, replace "valve (58" with -- valve (58) --.
Column 16, line 50, replace "mount" with -- amount --.
Column 20, line 24, replace "mower" with -- motor --.
Column 20, line 55, change "Theses" to -- These --.
Column 21, line 3, replace "pans" with -- parts --.
Column 21, line 24, change "avoiding" to -- avoid --.
Column 21, line 52, replace "no" with -- to --

UNITED STATES PATENT AND TRADEMARK OFFICE
CERTIFICATE OF CORRECTION

PATENT NO. : 5,543,243
DATED : August 6, 1996
INVENTOR(S) : William B. Brecht

It is certified that error appears in the above-indentified patent and that said Letters Patent is hereby corrected as shown below:

Column 22, line 10, change "coplaner" to -- coplanar --.
Column 24, line 6, change "coplant" to -- coplanar --.
Column 25, line 8, after "at least" delete "during".

Signed and Sealed this

Seventh Day of October, 1997

Attest:

BRUCE LEHMAN

*Attesting Officer*    *Commissioner of Patents and Trademarks*